(12) United States Patent
Ha

(10) Patent No.: US 7,702,938 B2
(45) Date of Patent: Apr. 20, 2010

(54) METHOD AND APPARATUS FOR IMPLEMENTING A HYBRID POWER MANAGEMENT MODE FOR A COMPUTER WITH A MULTI-CORE PROCESSOR

(75) Inventor: Min Hoon Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 882 days.

(21) Appl. No.: 11/423,034

(22) Filed: Jun. 8, 2006

(65) Prior Publication Data
US 2006/0279152 A1    Dec. 14, 2006

(30) Foreign Application Priority Data
Jun. 11, 2005    (KR) .................. 10-2005-0050093

(51) Int. Cl.
*G06F 1/32* (2006.01)
(52) U.S. Cl. .................. 713/323; 713/320; 713/324; 713/340
(58) Field of Classification Search ........... 713/320, 713/324, 323, 340
See application file for complete search history.

(56) References Cited

U.S. PATENT DOCUMENTS

| | | | | |
|---|---|---|---|---|
| 5,142,684 | A * | 8/1992 | Perry et al. ............... | 713/320 |
| 5,363,312 | A * | 11/1994 | Ninomiya ................. | 702/63 |
| 5,459,855 | A * | 10/1995 | Lelm ....................... | 713/400 |
| 5,913,068 | A * | 6/1999 | Matoba .................... | 713/322 |
| 6,501,999 | B1 * | 12/2002 | Cai .......................... | 700/82 |
| 6,711,691 | B1 * | 3/2004 | Howard et al. ........... | 713/300 |
| 6,804,632 | B2 * | 10/2004 | Orenstien et al. ........ | 702/188 |
| 6,901,522 | B2 * | 5/2005 | Buch ....................... | 713/320 |
| 7,086,058 | B2 * | 8/2006 | Luick ...................... | 718/102 |
| 7,093,147 | B2 * | 8/2006 | Farkas et al. ............. | 713/320 |

* cited by examiner

*Primary Examiner*—Chun Cao
(74) *Attorney, Agent, or Firm*—Fish & Richardson P.C.

(57) ABSTRACT

A method of implementing a hybrid mode of a multi-core processor includes setting a hybrid mode as a power management mode of the multi-core processor. The hybrid mode includes operating more than one core of the processor and alternately operating only a single core of the processor. The hybrid mode includes operating a first core of the processor and alternately operating a second core of the processor. The hybrid mode of a method, apparatus or computer readable medium includes alternate operation between two or more processor cores of a multi-core processor according to a preset or adjustable operating ratio.

21 Claims, 5 Drawing Sheets

FIG. 2

| AC power state | Temperature state | State of remaining quantity of battery | Power management mode |
|---|---|---|---|
| Presence of AC power | Low | · | DM |
| | Medium | · | HM(75%) |
| | High | · | HM(50%) |
| | Highest | · | HM(25%) |
| Absence of AC power | Low | Much (High) | HM(75%) |
| | | Normal (Medium) | HM(50%) |
| | | Less (Low) | SM |
| | Medium | Much (High) | HM(50%) |
| | | Normal (Medium) | HM(25%) |
| | | Less (Low) | SM |
| | High | Much (High) | SM |
| | | Normal (Medium) | SM |
| | | Less (Low) | SM |
| | Highest | Much (High) | SM |
| | | Normal (Medium) | SM |
| | | Less (Low) | SM |

SM : Single core mode
HM : Hybrid mode
DM : Multiple core mode

METHOD AND APPARATUS FOR IMPLEMENTING A HYBRID POWER MANAGEMENT MODE FOR A COMPUTER WITH A MULTI-CORE PROCESSOR

BACKGROUND

This description relates to a method and apparatus for implementing a hybrid mode of a multi-core processor.

Since multimedia performance requires multi-tasking and multiple high-speed operations, multi-core processors have been developed which include multiple cores provided in a single processor. In the multi-core processor, multiple cores share and process tasks, thereby enhancing processing performance. In addition, contrary to a case where a plurality of processors are provided, other portions of the multi-core processor except the cores can be shared, resulting in advantages of reduced production costs and a compact size.

A conventional portable computer system with a multi-core processor includes a processor (CPU) having a plurality of cores, a video controller, a main memory, a North Bridge for controlling the main memory, an input/output controller (I/O controller), a South Bridge that is a set of registers for managing input/output functions of peripheral devices, a hard disc (HDD), a keyboard controller, and a power controller. The power controller is operated while being connected to an operating system, the CPU and a core chip-set of the computer system, thereby controlling the supply of power to each core.

SUMMARY

In one general aspect, a method of implementing a hybrid mode of a multi-core processor includes setting a hybrid mode as a power management mode of the multi-core processor. The hybrid mode includes operating more than one core of the processor and alternately operating only a single core of the processor.

Implementations of this aspect may include one or more of the following features.

The hybrid mode includes performing a multiple core mode and a single core mode at alternate, predetermined time intervals. The hybrid mode includes alternately operating each core of a processor having two or more cores according to an operating time ratio. The hybrid mode includes alternately performing the multiple core mode and the single core mode with a hybrid mode having an operating time ratio of 50% set as a default power management mode.

A mode ratio of the hybrid mode is modified automatically or manually.

The method includes monitoring system conditions, and/or automatically modifying the mode ratio responsive to the monitored system conditions.

The system conditions include one or more of system temperature, processor temperature, AC power state, and the remaining quantity of a battery.

The method includes determining the mode ratio according to the monitored conditions.

The method includes setting the power management mode of the system to a hybrid mode having the determined mode ratio. The mode ratio is 25%, 50%, or 75%.

The method includes storing relationships between conditions relating to the power management mode of the processor and processor modes within a memory.

In another general aspect, an apparatus for implementing a hybrid mode of a multi-core processor includes a condition monitor for monitoring conditions relating to a power management mode of the processor, and a controller for setting a power management mode of a system to a hybrid mode responsive to the monitored conditions received from the condition monitor. The hybrid mode includes operating more than one core of the processor and alternately operating only a single core of the processor.

Implementations of this aspect may include one or more of the following features.

The condition monitor is configured for monitoring one or more conditions selected from the group consisting of processor temperature, system temperature, AC power state, the remaining quantity of a battery, manually selected power management mode, and automatically selected power management mode.

The controller is configured for determining a mode ratio of operating in the multiple core mode to operating time in the single core mode based on the monitored conditions while in the hybrid mode.

The apparatus is configured for providing a multiple core mode in which two or more cores operate, a single core mode in which only one core among a plurality of cores operates, and the hybrid mode in which operation in the multiple core mode alternates with operation in the single core mode.

The controller includes a mode table in which relationships between conditions related to power management modes of the processor and the power management modes of the processor are associatively stored.

A usage ratio of each core is adjustable according to system conditions detected by the condition monitor while in the multiple core mode.

The hybrid mode includes operating each core of two or more cores of the processor automatically and alternately according to a preset operating ratio.

In another general aspect, a method of implementing a hybrid mode in a multi-core processor having two or more cores includes monitoring conditions relating to the power management mode of the processor. A hybrid mode is selected, such as between a hybrid mode, multi-core mode and a single-core mode, according to monitored results of the conditions, and a power management mode of a system is set to the selected hybrid mode.

Implementations of this aspect may include one or more of the following features.

The conditions that are monitored include one ore more of processor temperature, system temperature, AC power state, or the remaining power of a battery.

Relationships between power management modes of the system and conditions relating to power management modes of the processor are stored within a memory device.

A mode ratio of each core of the processor if the hybrid mode is selected.

A hybrid mode with a mode ratio of 50% is set as a default power management mode of the system.

A multiple core mode or a single core mode is automatically or manually selected.

A usage ratio of each core of the processor is independently adjusted according to monitored conditions if in the multiple core mode.

In another general aspect, a computer-readable recording medium has computer-executable instructions for performing a method of implementing a hybrid mode of a multi-core processor having two or more cores. The method includes monitoring conditions relating to a power management mode of the processor, selecting one of a multiple core mode, a single core mode or a hybrid mode according to the monitored conditions, and controlling a supply of power to two or more cores if the multiple core mode is selected, controlling the supply of power to one core of the two or more cores if the single core mode is selected, and controlling the supply of power such that the multiple core mode and the single core mode are alternately performed if the hybrid mode is selected.

BRIEF DESCRIPTION OF THE DRAWINGS

FIG. 2 is a table of exemplary modes.

DETAILED DESCRIPTION

Figure 1:
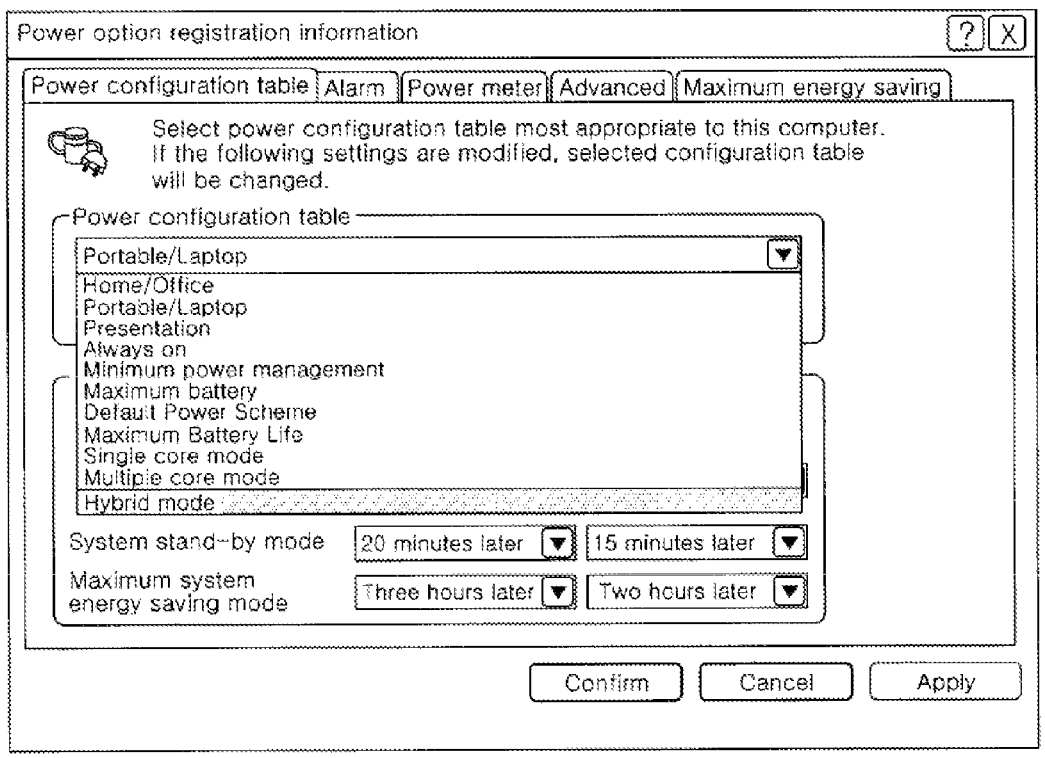
FIG. 1 is an exemplary power configuration table for manually setting a hybrid mode.

A conventional dual-core processor manages power in two modes, e.g., a multiple core mode where all the cores are activated to operate or a single core mode where either of the two cores is activated to operate. However, an effective power management technique using only one or the other modes includes inefficiencies in terms of optimal use of power. The present inventors have determined that selectively and alternately using the two modes, e.g., in a hybrid mode, permits an extensive and efficient use of system resources of the computer system.

When a plurality of cores operate in the multi-core processor, it is expected that power consumption may increase over that of a single-core processor. The increase in the power consumption typically results in a decrease in the continuous operating time of a battery in case of a portable computer. Even in a fixed system, increased power consumption generates more heat, which in turn shortens the lifespan of the system and deteriorates the function of the system. The use of a hybrid mode capable of reducing power consumption of a multi-core processor and operating a plurality of cores in an optimal condition is described in greater detail hereinafter.

The term "multi-core processor" refers to a system or a device that includes two or more processing cores in one chip to provide data processing capability. Although such a multi-core processor typically refers to a central processing unit of a computer, it includes all processors such as a coprocessor and/or an input/output processor. The term "multiple core mode" refers to a power management mode in which all of two or more cores in a processor are in operation. For example, in the case of a dual-core processor, both of the cores are in operation in a multiple core mode. In the case of a processor provided with three or more cores, a mode in which two or more cores are in operation refers to a multiple core more mode. The term "single core mode" refers to a power management mode in which only one of two or more cores in a processor is in operation.

The term "hybrid mode" refers to a mode in which the multiple core mode and the single core mode are alternately activated depending on some parameter, e.g., based on some ratio of operating time between multiple core mode and single core mode. For example, the hybrid mode includes a mode in which each core of a plurality of cores automatically and alternately operates for predetermined time periods, e.g., responsive to a predetermined or calculated time ratio. For example, in a hybrid mode in which the proportion of a first core is 30% and the proportion of a second core is 70%, the first core operates for three seconds and the second core then operates for seven seconds. At these time intervals, the operation of the first core and the second core alternatively switch between the operation of the first core and the second core.

The term "mode ratio" refers to the ratio of the duration of operating time in the multiple core mode to the duration of operating time in the single core mode while operating in a hybrid mode of the multi-core processor. In addition, or in the alternative, each core is automatically and alternatively activated in a hybrid mode where the mode ratio refers to the ratio of the duration of operating time of a first core to the duration of the operating time of a second core.

An exemplary mode ratio of the hybrid mode is defined as Equation 1 as follows:

$$\text{Mode ratio (\%)} = \frac{\text{(duration time of multiple core mode)}}{\text{(duration time of multiple core mode} + \text{duration time of single core mode)}} \times 100 \quad (1)$$

Accordingly, the hybrid mode with a mode ratio of 50% in a dual-core processor represents a mode in which the single core mode and the multiple core mode are alternatively performed for the approximately the same period of time, e.g., a total of 5 seconds in the multiple core mode and a total of 5 seconds in the single core mode. In addition, as expressed by Equation 1, power consumption increases as the mode ratio increases, whereas power consumption decreases as the mode ratio decreases.

In an exemplary process of setting the hybrid mode, a power management mode, such as a hybrid mode, of a multi-core processor provided with two or more cores is set by a user. If the hybrid mode is selected as the power management mode of the system by the user, the hybrid mode in which the single core mode and the multiple core mode are alternately performed is provided, e.g., instead of a single core mode and/or a multiple core mode provided by a conventional multi-core processor.

Referring to FIG. 1, an exemplary power configuration table provides a user with a way of manually setting the hybrid mode of the system. A user can manually set the power management mode of a portable computer system with an application, e.g., such as an applet or software. For example, a user executes the Control Panel Program of Windows installed in a portable computer system and selects one of the single core mode, multiple core mode, or hybrid mode as the power management mode of the portable computer system through the Power Management Applet Menu provided by the Control Panel Program. Alternatively, or in addition, the user selects the power management mode through the BIOS Set UP Menu.

Next, automatic setting of the power management mode of a portable computer system to an optimal power management mode suitable for the current status of the system will be described in greater detail hereinafter. If a user does not intend to manually set up the power management mode of the portable computer system through hardware or software, e.g., to individually select the power management mode, but to automatically set the power management mode, the only thing the user has to do is to select an automatic power management mode, such as the hybrid mode, through the Power Management Applet Menu or the BIOS Set UP Menu.

If the user selects the hybrid mode, the computer system sets the hybrid mode selected by the user as the power management mode of the corresponding system. For example, the hybrid mode is a mode in which the multiple core mode and the single core mode are alternately performed for certain time intervals or durations, e.g., alternating between each mode at predetermined intervals and/or for a preset, aggregate time period within each mode. There may be one or more various hybrid modes according to the ratio of the duration of operating time within the multiple core mode to the duration of operating time within the single core mode. As an example of another hybrid mode, in a dual-core system with two cores, it is possible to implement a mode in which a first core and a second core alternately operate responsive to or according to predetermined operating ratios. For example, in such a hybrid mode, if the default ratio thereof is 50% and a user select this hybrid mode, the cores operate in a mode in which the operation proportion of the first core is 50% and the operation proportion of the second core is 50% and the operations of the cores are automatically and alternately performed. Accordingly, for example, it is possible to implement a mode in which the first core and the second core automatically switch and alternately operate at a time interval of five seconds each during a total of 10 seconds of operating time.

If the user selects a hybrid mode that is a mode in which the multiple core mode and the single core mode are alternately performed at certain operating intervals, a hybrid mode with a mode ratio of 50% is preset as the default mode in a given environment. Therefore, the multiple core mode and the single core mode are alternately performed at the same duration time interval.

However, the mode ratio of the hybrid mode may be selected by a user or automatically modified and preset within the application by the programmer. In the case where the mode ratio is modified according to user's selection, the user can select a specific mode ratio through a user interface program, such as a power management program operated under the Control Panel. In the case where the mode ratio is automatically modified, one or more conditions among system temperature, processor temperature, AC power state, and/or the remaining power of a battery are monitored. In addition, or alternatively, other operating conditions may be added to, substitute for, and/or modify the aforementioned conditions for automatically modifying the mode ratio of the hybrid mode. For example, the conditions used for determining the hybrid mode are not limited to the conditions described above, but other conditions may be used for determining the hybrid mode. In addition, dominant conditions and/or subordinate conditions may be prioritized by the user or automatically within the encoded instructions of the application itself, e.g., those conditions which are used for determining a mode ratio may be ranked in order of importance and/or modified.

For example, in one implementation, temperature can be used as a dominant condition and the other conditions, such as AC power state, are subordinately judged relative to the temperature so as to determine a dynamic mode ratio. In another implementation, another condition, such as AC power state can be set as a dominant condition, and alternative conditions, such as temperature, can be set as a subordinate condition.

When the above conditions are monitored, a mode ratio is dynamically determined according to the monitored conditions. If a hybrid mode with a specific mode ratio is selected as described above, the power management mode of the system is set to the hybrid mode with the determined mode ratio. Although a mode ratio is typically set to one of 25%, 50% and 75%, these are exemplary ratios and may be set at larger or smaller increments, such as 33.33% or 12.5% intervals. A hybrid mode with another mode ratio may be implemented according to a system condition or user's selection.

In order to determine a hybrid mode according to the monitored conditions, the relationships between the monitored conditions and the power management mode of a processor and processor modes can be stored in a memory, e.g., such as within a look-up table or as logic encoded thereon. This memory may be implemented as a flash memory or within a memory device or system memory, such as ROM or RAM.

Referring to FIG. 2, an exemplary mode table includes the relationships between the conditions related to the power management mode and processor modes. Various conditions for automatically setting the power management mode, such as processor temperature, system temperature, whether AC power is applied, the remaining quantity of a battery, and/or power management modes corresponding to the above conditions, are associative with power management mode are stored in the mode table. The individual power management modes, such as the single core mode and the multiple core mode, are stored together with the hybrid mode.

For example, the temperature of the surface of a processor is stored as one of the following values, including highest temperature, high temperature, medium temperature and low temperature, and the remaining power of a battery may be stored as one of high, medium and low. A criterion for classification of the temperature into highest, high, medium and low is established such that the processor temperature is classified as low if the processor temperature is lower than a first threshold T1, the temperature T is classified as medium if the processor temperature is higher than the first threshold T1 and lower than a second threshold T2, as high if the processor temperature is higher than the second threshold T2 and lower than a third threshold T3, and as highest if the processor temperature is higher than the third threshold T3. For example, temperature T1 may be degrees, T2 may be degrees, and T3 may be degrees. Here, the values of reference temperature such as the first threshold T1, the second threshold T2, and the third threshold T3 can be set to various values according to the performance of a computer system.

A criterion for classification of the remaining quantity of a battery into high (much), medium (normal), and low (less) is established such that based on the amount of remaining charged power of 100%, the remaining quantity of the battery is classified as low (less) in case of less than 20%, as medium (normal) in case of 20%~50%, and as high (much) in case of over 50%.

As described above, various conditions related to the power management modes of the system, and the power management modes associated with these conditions are stored in the memory, so that a power mode most optimal to such system conditions can be selected using the monitored results of these conditions.

Referring to FIG. 2, if an external power source (AC power source) is connected and the processor temperature is low, the power management mode can be set to the multiple core mode regardless of the remaining quantity of a battery. If external power is applied and the processor temperature is medium, the power management mode can be set to a hybrid mode with a mode ratio of 75%. If external power is applied and the processor temperature is high, the power management mode is set to a hybrid mode with a mode ratio of 50%. If external power is applied and the processor temperature is highest, the power management mode can be set to a hybrid mode with a mode ratio of 25%.

On the other hand, in a case where external power is not applied and the processor temperature is low, the power management mode can be set to a hybrid mode with a mode ratio of 75% if the remaining quantity of a battery is high, and a hybrid mode with a mode ratio of 50% if the remaining quantity of a battery is medium.

Figure 3A:
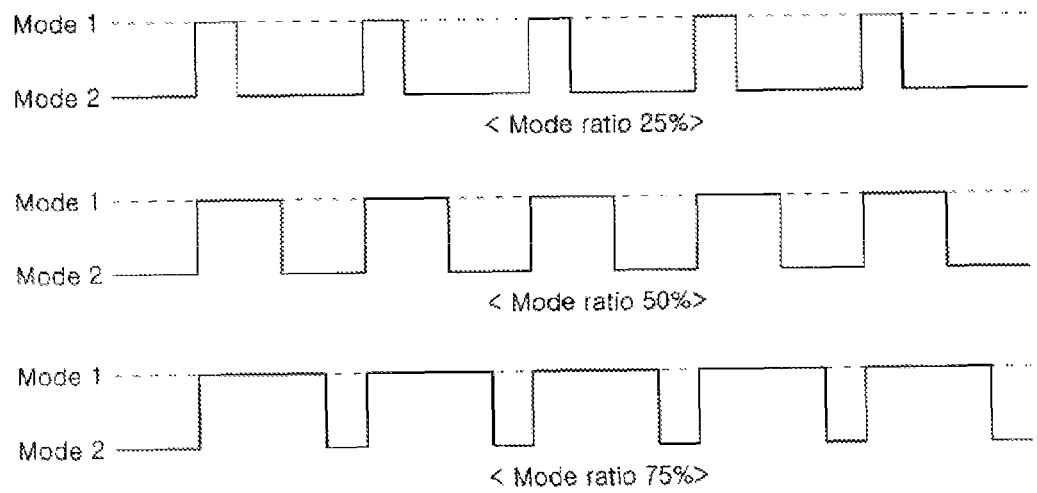
FIG. 3a represents examples of implementing hybrid modes with a variety of mode ratios in a dual-core processor.

Referring to FIG. 3A, hybrid modes can be implemented with a variety of mode ratios in a dual-core processor. "Mode 1" is a mode in which two cores operate, and "Mode 2" is a mode in which either of two cores operates. In a dual-core system with two cores according to another implementation, "Mode 1" may be a mode in which only a first core operates, and "Mode 2" is a mode in which only a second core operates. Hereinafter, a mode in which the multiple core mode and the single core mode are alternately performed at certain time intervals is explained by way of example. FIG. 3*a* shows cases in which mode ratios are 25%, 50% and 75%, respectively.

In the case where the mode ratio is 50%, the duration of the operating time of Mode 1 is the same as that of Mode 2. In the case where the mode ratio is 25%, the duration of the operating time of Mode 1 is one-third as many times as that of Mode 2. On the other hand, in the case where the mode ratio is 75%, the duration time of Mode 1 is three times as long as that of Mode 2.

Figure 3B:
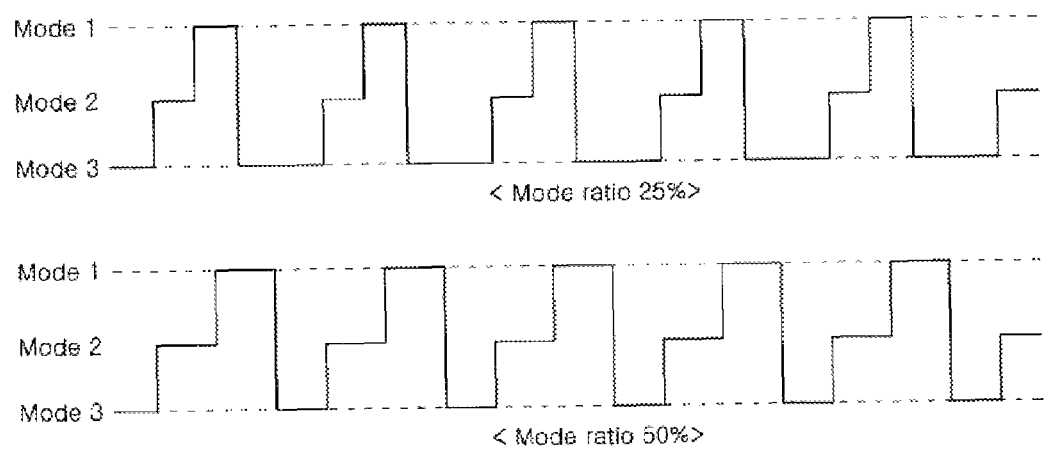
FIG. 3b represents examples of implementing hybrid modes with a variety of mode ratios in a three-core processor.

Referring to FIG. 3B, hybrid modes can be implemented with a variety of mode ratios in a three-core processor. In FIG. 3B, "Mode 1" is a mode in which three cores operate, and "Mode 2" is a mode in which two cores out of three cores operate. "Mode 3" is a mode in which one core out of three cores operates. In another implementation, three cores may be configured such that, for example, "Mode 1" is a mode in which only a first core operates, "Mode 2" is a mode in which only a second core operates, and "Mode 3" is a mode in which only a third core operates. FIG. 3B shows cases in which mode ratios are 25% and 50%, respectively. In case of a multi-core processor with three or more cores, the mode ratio may be variously adjusted in the same manner as the dual-core processor.

Figure 4:
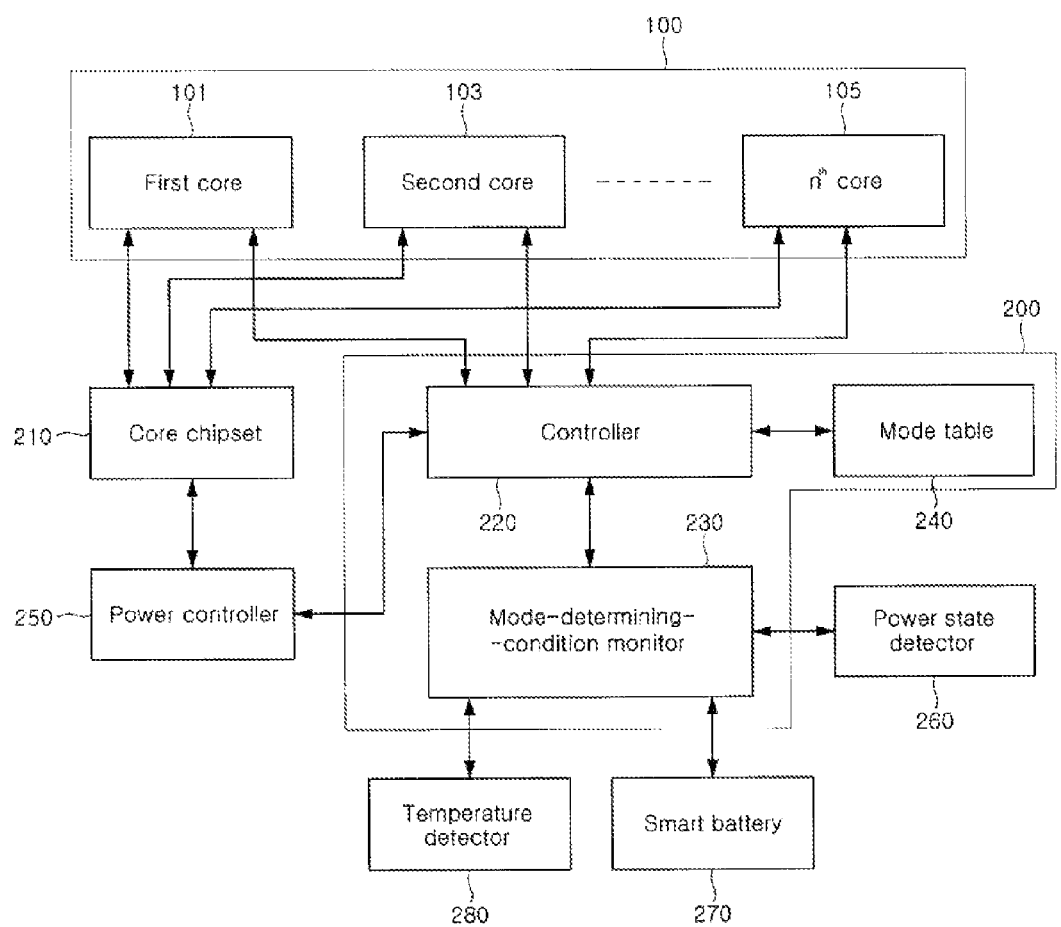
FIG. 4 is a functional block diagram of an apparatus for implementing a hybrid mode of a multi-core processor.

Referring to FIG. 4, a portable computer system includes an apparatus for implementing a hybrid mode of a multi-core processor after setting the power management mode. The overall computer system includes a processor 100 including two or more cores, and a device for implementing a hybrid mode 200.

The computer system includes a power controller 250 for controlling a supply of power to each core, and the device for implementing the hybrid mode 200 includes a mode-determining-condition monitor 230 and a controller 220. The hybrid mode device 200 provides a single core mode, a multiple core mode, and a hybrid mode as power management modes.

In order to select a power management mode, a user of a computer system can manually select one of the three power management modes, and/or cause the power management mode of the computer system to be automatically set to an optimal power management mode. The mode-determining-condition monitor 230 monitors system conditions related to the power management mode of the multi-core processor. The system conditions monitored by the mode-determining-condition monitor 230 are not specifically limited. For example, any one or more of processor temperature, system temperature, AC power state, the remaining quantity of a battery, and/or user selected parameters can be monitored.

The mode-determining-condition monitor 230 is connected to a power state detector 260 to continuously detect whether AC power is applied from an external power source, such as through an AC plug, and to transmit the detection results to the controller 220. In addition, the mode-determining-condition monitor 230 is connected to a smart battery 270 which checks the remaining quantity of a battery, transmits the results to the controller 220, and receives temperature data from a temperature sensor or detector 280 to transmit the data to the controller 220. Information on the remaining power of the battery and/or processor temperature can be obtained from an operating system of the computer system.

The controller 220 receives mode-determining-condition data from the mode-determining-condition monitor 230, and configures a hybrid mode according to the mode-determining-conditions. The controller 220 can support the multiple core mode in which two or more cores operate, the single core mode in which only one core among a plurality of cores operates, and the hybrid mode in which the multiple core mode and the single core mode are alternately performed at a predetermined duration time ratio.

In another implementation of the hybrid mode, a hybrid mode may be implemented in a dual-core processor in such a manner that mode 1 in which only a first core operates and mode 2 in which only a second core operates are alternately performed according to a predetermined operating ratio. When a hybrid mode is configured, the controller 220 can refer to a mode table 240 storing conditions relating to the power management mode of the system and associated optimal power management modes. When the power management mode of the computer system is set, the optimal power management mode that is stored in association with these conditions is confirmed from the mode table 240, and a hybrid mode with a calculated, dynamic mode ratio is determined as the power management mode of the computer system.

The power controller 250 controls the supply of power to each core according to the power management mode determined by the controller 220. Specifically, a core select driver that can supply an enable signal to each core of the processor is installed, and each core is controlled through a register in the processor. For example, each register has the same number of bits as the number of cores.

The apparatus for implementing a hybrid power management mode of a multi-core processor supports the single core mode and the multiple core mode as well as the hybrid mode. In case of the multiple core mode, the usage ratio of each core can be controlled to be different from one another. Accordingly, in a dual-core processor, the multiple core mode supports a case where both first and second cores are used in a ratio of 100%, but also supports a case where the first core operates in a ratio of 50% and the second core operates in a ratio of 75%. For example, the usage ratio of each core can be adjusted by controlling an operating voltage of each core.

Hereinafter, the operation of an exemplary apparatus which implements a hybrid power management mode of a multi-core processor will be described in greater detail hereinafter. The temperature detector 280 continuously detects the temperature of the surface of the processor, and transmits the detected value of temperature to the mode-determining-condition monitor 230. The smart battery 270 is recharged with AC power applied from outside, and notifies the mode-determining-condition monitor 230 of the remaining power of the battery. The power state detector 260 continuously detects whether or not AC power is applied from outside, and notifies the mode-determining-condition monitor 230 of the detected results. The mode-determining-condition monitor 230 receives data on the conditions for determining the power management mode of the processor from the power state detector 260, the smart battery 270, and the temperature detector 280, and transmits the data to the controller 220.

The controller 220 selects a power management mode based on the data relating to the conditions received from the mode-determining-condition monitor 230, and simultaneously and dynamically determines a mode ratio if the hybrid mode has been selected. When the mode ratio of the hybrid mode is determined, reference is made to the mode table 240 storing various conditions for automatically setting the power management mode associated with power management modes.

For example, if the temperature of the surface of the computer input from the temperature detector 280 is medium, the remaining quantity of recharged power input from the smart battery 270 is medium. If AC power is applied, e.g., as detected by the power state detector 260, a power management mode suitable for the state corresponding to these conditions is confirmed as a hybrid mode (with a mode ratio of 75%). The power controller 250 alternately performs "Mode 1" and "Mode 2" of the computer system to conform to the hybrid mode (with the mode ratio of 75%) selected by the controller 220.

Figure 5:
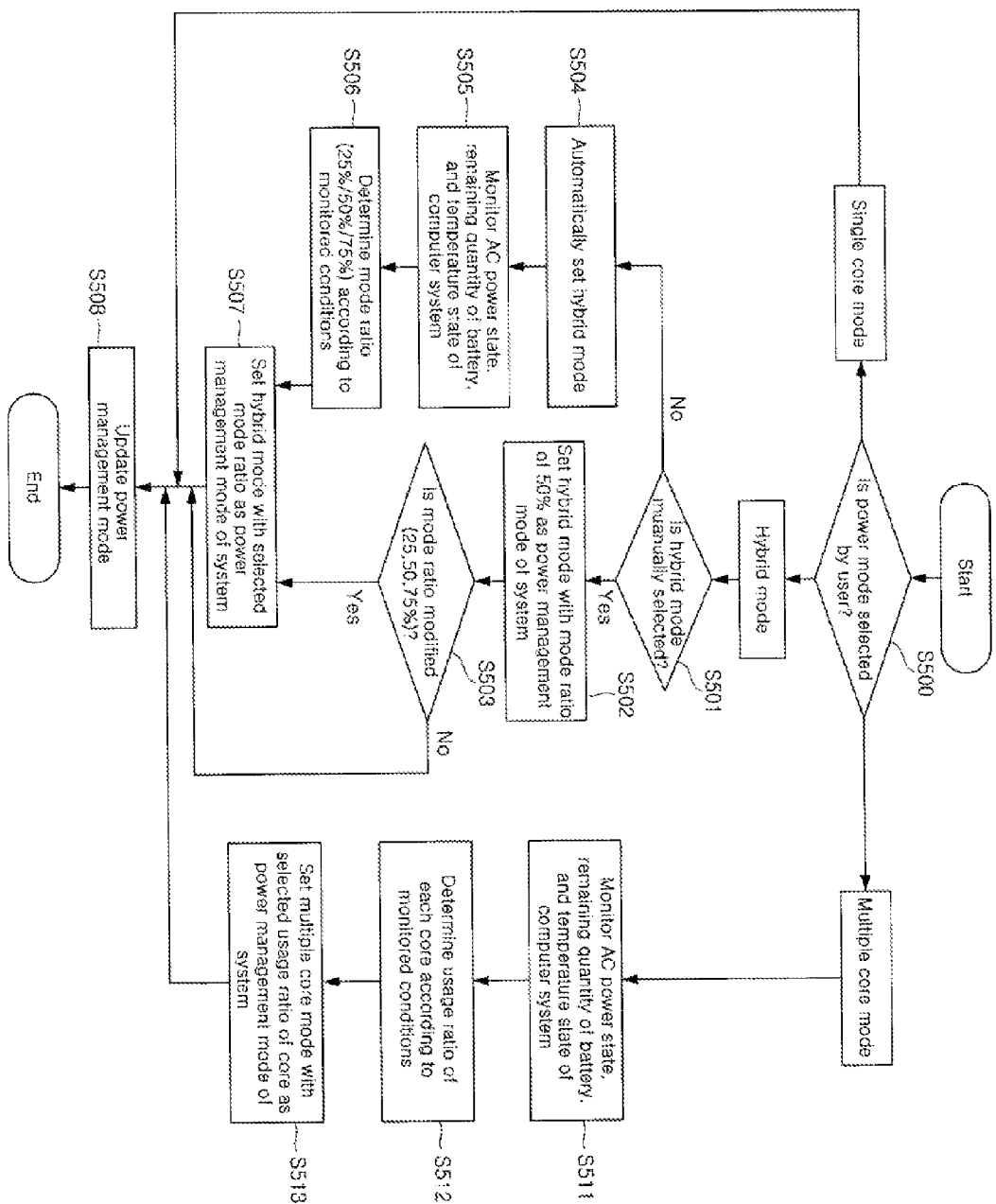
FIG. 5 is a flowchart of a process for implementing a hybrid mode of a multi-core processor.

Referring to FIG. 5, a flowchart of a process for implementing a hybrid mode of a multi-core processor includes three power modes. Three power modes, including the single core mode, the multiple core mode, and the hybrid mode, are provided for selection by the user and/or for the automatic designation by the system. If one of the three power modes is selected, the selected power mode may be set up as a default mode in a computer system, and a user may change the appropriate settings if desired. Alternatively, the system may monitor one or more operating conditions relating to the power management of the system, and automatically change the power mode setting.

If the power mode is selected by a user (S500), an initial default mode may be set to the multiple core mode. If it is determined that the user has manually selected a hybrid mode (S501), a hybrid mode with a mode ratio of 50% is set as the default power management mode of the system (S502). The hybrid mode with the mode ratio of 50% is the default mode, and various mode ratios (25%, 50%, 75% and the like) may be provided for the user's selection. If it is determined that the power mode needs to be changed from the default mode to another hybrid mode with a different mode ratio through user's selection (S503), the user may select a new mode ratio, such as 75%, of a hybrid mode and the new, selected mode ratio is set as the power management mode of the system (S507). The new, selected mode ratio is updated as the power mode of the entire system, and the system operates in the updated mode (S508).

Alternatively, when the power mode is automatically set to the hybrid mode (S504), process steps subsequent to step S504 are performed. For example, one or more conditions selected from the group of processor temperature, system temperature, AC power state, the remaining quantity of a battery, and/or whether a user has selected a specific power mode through a user interface program, such as a power management program, are monitored (S505). After the conditions are monitored, a hybrid mode with a mode ratio suitable to each of the conditions is determined (S506).

When a power management mode most appropriate to the conditions of the system is determined, this power management mode is set as the power management mode of the system (S507) to update the power management of the system (S508). At this time, the multiple core mode and the single core mode are alternately performed according to the determined mode ratio. In a case where the multiple core mode is selected by the user in step S500, each core may be controlled to operate with maximum performance and the usage ratio of the core is 100%.

However, the usage ratio of the core may be controlled in different ways according to a load applied to the core or system conditions. If the usage ratio of each core is controlled to be different from the remaining cores in the multiple core mode, conditions such as the usage ratio of each core, processor temperature, system temperature, AC power state, the remaining quantity of a battery, and/or other conditions are first monitored (S511). After each condition is monitored, the usage ratio of each core is determined to be suitable for each condition (S512), and a multiple core mode with the selected usage ratio of the core is set as the power management mode of the system (S513).

If the power mode selected by the user is the single core mode (S500), e.g., in the case of two cores, it is possible to set the default ratio beforehand in which only a first core operates. Otherwise, the power mode of the system is set to a single core mode in which only a second core is beforehand set to operate.

As described above, the hybrid mode in which the single core mode and the multiple core mode are alternately performed is provided in addition to the conventional single core mode and multiple core mode. Even in case of the multiple core mode, the usage ratio of each core is flexibly controlled according to system conditions, so that a user can utilize a system more efficiently.

The foregoing method of implementing a hybrid mode of a multi-core processor may be implemented with a computer-readable instruction or codes stored in a computer-readable recording medium. The computer-readable recording medium includes one or more of the following devices for storing computer-readable instructions, including ROMs, EEPROMs, flash EEPROMs, floppy disks, CD-ROMs, optical data storage devices, and other internal or external memory devices. For example, where an application program for implementing one or more of the aforementioned methods is stored in a ROM, the application may be written into the ROM during a semiconductor fabrication process.

A computer-readable recording medium stores program codes executable by a computer to perform a method of implementing a hybrid mode of a multi-core processor with two or more cores, wherein the method includes monitoring conditions relating to a power management mode of the processor. The method includes selecting one of a multiple core mode, a single core mode and a hybrid mode responsive to monitored system conditions, and controlling a supply of power to two or more cores if the multiple core mode is selected, and controlling the supply of power to one of the two or more cores if the single core mode is selected in the selecting step. The method includes providing a hybrid mode in which the multiple core mode and the single core mode are alternately performed.

Since the method and apparatus for implementing a hybrid mode of a multi-core processor supports a hybrid mode where a multiple core mode and a single core mode are alternately performed in a processor with two or more cores, the performance of the processor can be optimized in a variety of ways. In addition, or in the alternative, power consumption can be managed more efficiently.

It should be understood that the above-described implementations are not limited by any of the details of the foregoing description. Accordingly, other implementations are within the scope of the following claims.

For example, the method and apparatus for implementing a hybrid mode of a multi-core processor according to the present invention can be applied to various mobile devices such as desk-top computers or servers, notebook computers, smart phones, cellular phones, PDAs (personal data assistants) and other processor-enabled devices.

Although a dual-core processor with two cores has been described, the foregoing method and apparatus can be applied to a processor with three or more cores.

What is claimed is:

1. A method of implementing a hybrid mode of a multi-core processor, the method comprising setting a hybrid mode as a power management mode of the multi-core processor, wherein the hybrid mode includes operating more than one core of the processor and alternately operating only a single core of the processor, the alternative operation being performed according to a predetermined time ratio, wherein the operating time ratio of 50% is set as a default power management mode.

2. The method of claim 1, wherein the hybrid mode comprises alternating between a multiple core mode and a single core mode at fixed time intervals.

3. The method of claim 1, further comprising modifying a mode ratio of the hybrid mode.

4. The method of claim 1, further comprising:
monitoring system conditions; and
automatically modifying the mode ratio responsive to the monitored system conditions.

5. The method of claim 4, wherein the system conditions comprise one or more of system temperature, processor temperature, AC power state, and the remaining quantity of a battery.

6. The method of claim 5, further comprising:
determining the mode ratio according to the monitored conditions; and
setting the power management mode of the system to a hybrid mode having the determined mode ratio.

7. The method of claim 4, wherein the mode ratio is 25%, 50%, or 75%.

8. The method of claim 1, further comprising storing relationships between conditions relating to the power management mode of the processor and processor modes within a memory.

9. An apparatus for implementing a hybrid mode of a multi-core processor, the apparatus comprising:
a condition monitor for monitoring conditions relating to a power management mode of the processor; and
a controller for setting a power management mode of a system to a hybrid mode responsive to the monitored conditions received from the condition monitor, wherein the hybrid mode includes operating more than one core of the processor and alternately operating only a single core of the processor, the alternative operation being performed according to a predetermined time ratio, wherein the operating time ratio of 50% is set as a default power management mode.

10. The apparatus of claim 9, wherein the condition monitor is configured for monitoring one or more conditions selected from the group consisting of processor temperature, system temperature, AC power state, the remaining quantity of a battery, manually selected power management mode, and automatically selected power management mode.

11. The apparatus of claim 9, wherein the controller is configured for determining a mode ratio of operating in the multiple core mode to operating time in the single core mode based on the monitored conditions while in the hybrid mode.

12. The apparatus of claim 9, wherein the apparatus is configured for providing a multiple core mode in which two or more cores operate, a single core mode in which only one core among a plurality of cores operates, and the hybrid mode in which operation in the multiple core mode alternates with operation in the single core mode.

13. The apparatus of claim 9, wherein the controller further comprises a mode table in which relationships between conditions related to power management modes of the processor and the power management modes of the processor are associatively stored.

14. The apparatus of claim 9, wherein a usage ratio of each core is adjustable according to system conditions detected by the condition monitor while in the multiple core mode.

15. The apparatus of claim 9, wherein the hybrid mode includes operating each core of two or more cores of the processor automatically and alternately according to a preset operating ratio.

16. A method of implementing a hybrid mode in a multi-core processor having two or more cores, the method comprising:
monitoring conditions relating to the power management mode of the processor;
selecting a hybrid mode according to monitored results of the conditions; and
setting a power management mode of a system to the selected hybrid mode;
determining a mode ratio of each core of the processor if the hybrid mode is selected, wherein the mode ratio of 50% is set as a default power management mode.

17. The method of claim 16, wherein monitoring conditions comprises monitoring processor temperature, system temperature, AC power state, or the remaining power of a battery.

18. The method of claim 16, further comprising storing relationships between power management modes of the system and conditions relating to power management modes of the processor within a memory device.

19. The method of claim 16, further comprising selecting a multiple core mode or a single core mode.

20. The method of claim 19, further comprising independently adjusting a usage ratio of each core of the processor according to monitored conditions if in the multiple core mode.

21. A computer-readable recording medium having computer-executable instructions for performing a method of implementing a hybrid mode of a multi-core processor having two or more cores, the method comprising:
monitoring conditions relating to a power management mode of the processor;
selecting one of a multiple core mode, a single core mode or a hybrid mode according to the monitored conditions; and
controlling a supply of power to two or more cores if the multiple core mode is selected, controlling the supply of power to one core of the two or more cores if the single core mode is selected, and controlling the supply of power such that the multiple core mode and the single core mode are alternately performed if the hybrid mode is selected, the alternative operation being performed according to a predetermined time ratio, wherein the operating time ratio of 50% is set as a default power management mode.

* * * * *